Jan. 20, 1970 D. W. BERNARD 3,491,352

STROBE SYSTEM EMPLOYING A MULTICHANNEL RECORDING TRANSDUCER FOR RECORDING STROBE BITS

Filed Jan. 3, 1967 3 Sheets-Sheet 1

INVENTOR.
DAVID W. BERNARD
BY John J. McCormack
ATTORNEY

INVENTOR
DAVID W. BERNARD
BY
John J. McCormack
ATTORNEY

INVENTOR.
DAVID W. BERNARD
BY
John J. McCormack
ATTORNEY

United States Patent Office 3,491,352

Patented Jan. 20, 1970

3,491,352

STROBE SYSTEM EMPLOYING A MULTICHANNEL RECORDING TRANSDUCER FOR RECORDING STROBE BITS

David W. Bernard, Sherborn, Mass., assignor to Honeywell Inc., Minneapolis, Minn., a corporation of Delaware Filed Jan. 3, 1967, Ser. No. 606,875
Int. Cl. G11b *5/00;* G08b *23/00*
U.S. Cl. 340—174.1 3 Claims

ABSTRACT OF THE DISCLOSURE

A single elongate electrical conductor for recording a related array of data bits in one or more patterns, this conductor being shaped in accordance with the relative pattern locations of these bits on a record medium so that a bit-pattern is recorded upon passage of a current pulse through the conductor. In one particular form, such a condutor comprises a multichannel recording transducer for recording a prescribed number of strobe bits. In another embodiment the conductor takes the form of both a human-readable character and also of a machine-encoding bit pattern associated therewith. Each bit-segment of such a single conductor transducer is preferably arranged to take the form of a prescribe loop for magnetically recording the corresponding profile of this loop on an adjacent magnetic record medium.

BACKGROUND, INVENTION FEATURES

In the data processing arts, and in particular, in the art of recording a prescribed multiple pattern of multiple data bits upon a (magnetic) medium, it is commonly problematical to arrange a plurality of recording transducers according to the prescribed bit pattern with efficiency, yet with convenience and economy. Transducer crowding commonly occurs, leading to fussy, expensive fabrication procedures for the transducer array. The present invention proposes an extremely inexpensive, yet surprisingly efficient medium-conforming array of multiple transducers arranged in the form of a single shaped conductor such as may be printed upon a resilient non-conductive web in a single integral pattern.

Such a multi-transducer conductor has particular advantage for recording a pattern of strobe signals selectively upon a strobe-record medium such as may be used in document-handling apparatus such as card readers and the like. For instance, in such machines this type conductor may be readily conformed about the surface of a magnetic (strobe) recording drum adapted to lay down a pattern of strobe signals selectively at any time and cooperating with a readout head for sending these strobe signals to machine utilization means, such as for sequencing the readout of punched card columns, as known in the art. It will be readily apparent to those skilled in the art that so printing this single conductor strobe head on a resilient non-conductive web allows one to merely pulse the conductor and simultaneously record an entire strobe pattern at any place on a recording medium. Such a strobe pattern may be recorded responsive to the sensed position of a document and will be appreciated as new and highly advantageous in the art.

Other, unexpected advantages have also derived from the use of such a single conductor strobe head where, for instance, in addition to the aforementioned strobe bit generating segments (e.g. loops) of the conductor, it may also be shaped to record position-indicating bits which can be employed with the strobe bits in a versatile manner for instance, for generating multiple, selectible frequencies of strobe signals with a single web array and the like. Alternatively, a plurality of single conductor, multitransducers may be printed in common along different tracks of such a web to provide different strobe frequency channels which may be read out by different read heads, selectible according to the desired strobing frequency. Even more unexpectedly such a multifrequency pattern of strobe bits may be provided by a single conductor having a prescribed "fanned-out" array of transducer loops. With such an array each loop has a prescribed difference in pitch between the upper and lower extremities thereof so that the mere translation of a transducer across the loop height (transverse the recording direction) will generate a gradually and continuously varying range of strobe frequencies.

According to another inventive feature the above multipatterned conductor may be configured to take the form of a human-readable character along one portion thereof and a machine-encoded version of this character along another segment thereof to simultaneously record human-readable and machine-readable information in alignment, doing so simply and conveniently and being thus automatically oriented for operator verification, automatic readout and the like.

Thus, it is an object of the invention to provide the aforegoing features and advantages as well as others, such as those described below. More particularly, it is an object of the invention to provide a multibit single conductor recording transducer. Still another object is to provide such a transducer for simultaneously recording a prescribed strobe bit pattern at selectable times. Still another object is to provide a plurality of such strobe patterns for selective readout on prescribed channels. Yet another object is to provide such a strobe pattern whereby a single conductor (loop) segment comprises a head for recording a respective strobe bit mark. A still further object is to provide such a looped conductor pattern whereby the loops are "fanned-out" to provide a prescribed continuous range of strobe frequencies, each being selectable according to read head position along the loop height. Still another object is to provide such a multitransducer conductor forming a dual character head. Yet a further object is to provide such a head for simultaneously recording human readable and machine readable bit patterns in alignment. Other objects and features of advantage will become more apparent to those skilled in the art upon consideration of the following specification describing the best ways of applying the invention so as to enable those skilled in the art to make and use the same.

In the figures, wherein like reference numerals denote like elements:

Figure 1:
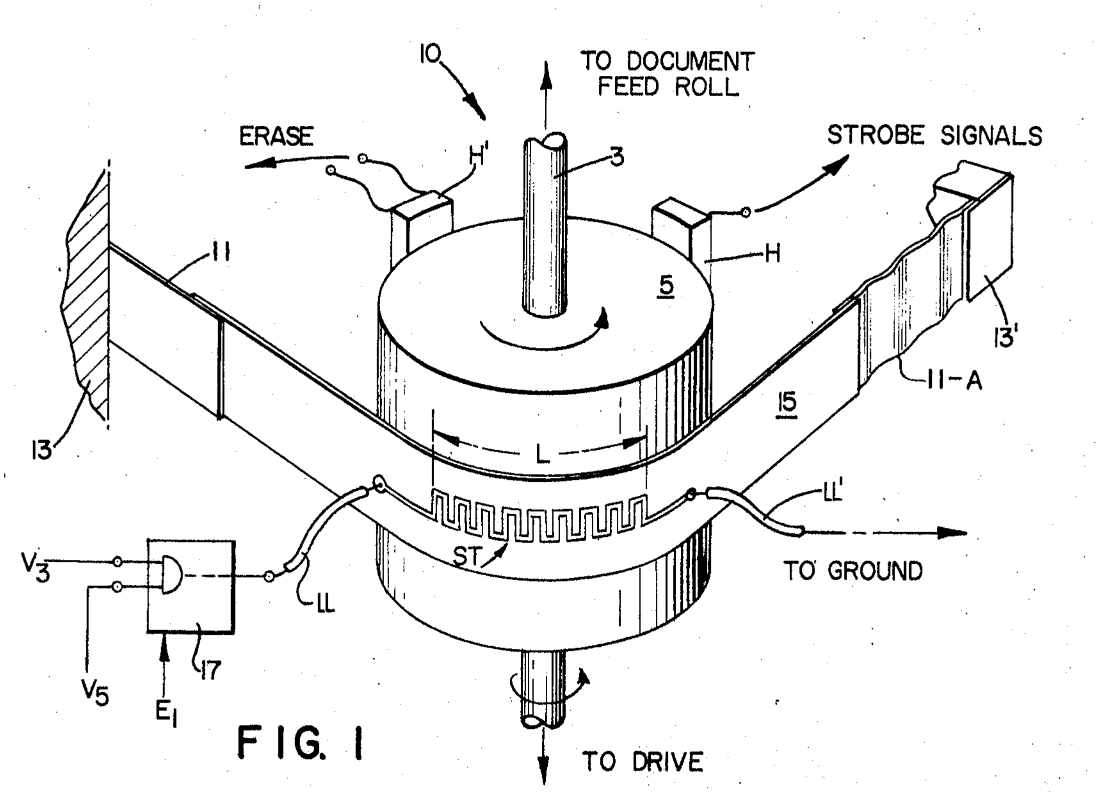
FIGURE 1 is an isometric view of a strobe head according to the invention as incorporated into an associated strobe recording and control arrangement, this arrangement comprising part of a conventional document handling machine such as a card reader.

Many useful salient features of the invention are best understood upon considering the elements of the strobing system 10 in FIGURE 1. System 10 is especially adapted to generate a prescribed pattern of strobe signals according to the invention by, generally, recording a strobe pattern with a strobe head 1 onto a recording drum 5 entirely asynchronously, i.e. at any time indicated by a "start (strobe) signal" and thereafter reading out with a read head H. Strobe system 10 may form part of a known type record handling machine which generates such a "start signal" upon arrival of a (data processing) record at a record sensing station thereof (or any analogous event). For instance, system 10 is especially adaptable to be coupled for synchronous operation with a conventional card transport at the read station of a known type punched card reader so as to automatically generate strobe signals when a card arrives at the read station and apply these signals to control the column-by-column readout from the card. System 10 includes a novel strobe generating means (strobe head) 1 for providing a pattern of strobe signals according to one feature of the invention, other related strobe head embodiments being schematically indicated in FIGURES 2, 3, 4 and 5. From a broad overall viewpoint the strobe pulse generating system 10 in FIGURE 1 may be understood as functionally comprising strobe head 1 in combination with a movable recording medium, such as magnetic recording drum 5 strobe control E, read head H and erase head H'. Drum 5 is adapted to be rotatably advanced (by means not shown) in synchronism with data record advance means, such as the card feed rolls (not shown) which conventionally advance punched cards through a read station in a card reader. Strobe head 1 includes a novel single, multitransducer conductor ST on a substrate web 15. Conductor ST is disposed in recording relation with drum 5, such as by disposing it along substrate web 15 and stretching the web contactingly about a prescribed recording sector L of the drum. To facilitate this head/drum contact, a pair of head support means, or couplings 11, 11–A, grip opposite ends of head 1 to support it from fixed anchoring points 13, 13' such as portions of the overall machine frame. One such coupling 11–A preferably includes a compliant portion for maintaining this engagement while drum 5 continually rotates.

As described below in more detail, substrate web 15 preferably takes the form of a non-conductive (plastic) tape engaged against drum 5, or close thereto, on the side opposite that to which strobe conductor ST is affixed. ST is formed into a multitransducer strobe-bit pattern, that is, it includes a prescribed number of transducer loops spaced a prescribed uniform "bit distance" along a strobe sector L of the drum plane and having a pair of current supplying leads LL, LL' connected to opposite ends thereof. As described below, transducer array ST may be energized by application of a prescribed current pulse therethrough to simultaneously impress regularly spaced "spots" of magnetization (i.e. record strobe bits) along a prescribed segment of drum 5 at the aforementioned "start-time" (for instance corresponding to detection of a card arriving at the read-station). This energization of ST may be controlled as functionally indicated by strobe control unit 17, understood as adapted to apply a current pulse to transducer array ST upon application of prescribed initiating ("start-strobe") control signals V3, V5, one of which may be the output from a card leading edge detector. It will be understood that web 15 need not in all cases contact drum 5. One alternative is to interpose a "frictionless" skid such as a Teflon web, which can be readily replaced. Another is to space web 15 from drum 5 and, to maintain a constant gap as well as to strengthen magnetic flux output, provide a magnetic "keeper" means on the non-recording side of web 15 (opposite drum 5), such a "keeper" may comprise a curved ferrous plate, a Permalloy plating or the like. Furthermore, conductor ST need not always be mounted upon a resilient web, though this is often advantageous. Conductor ST may even at times be rigid, self-supporting and self-conforming along the recording plane.

Figure 2:
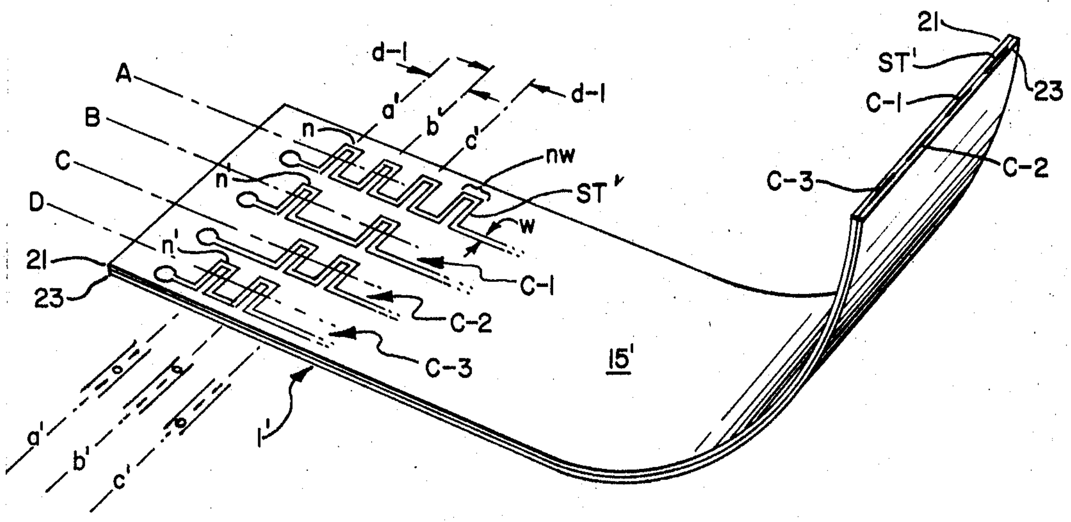
FIGURE 2 is a top isometric view of a strobe head similar to that in FIGURE 1 but slightly modified to include a plurality of strobe head patterns.

The multi-transducer strobe head 1 may be better understood by considering a closely related form thereof, namely, strobe head 1' in FIGURE 2 shown in top isometric view (and folded up) there. As with head 1, head 1' comprises a plastic web 15' on which is affixed a single multi-transducer strobe conductor ST' shaped into regular loops, or nodes *n*, each node being centered along a prescribed column axis *a'*, *b'*, *c'* etc. Conductor ST' thus comprises a plurality of single turn loops, each loop understood as functioning as a strobe bit recording transducer at its respective column, or bit-position. Thus each loop *n* and column *a'*, *b'* etc. is spaced by a common column-spacing (transducer spacing) *d*-1. In this preferred form, web 15' comprises a pair of upper and lower resilient plastic tape layers, 21, 31, respectively, between which strobe conductor ST' is sandwichly and adherently fixed. For instance, conductor array ST' may be "printed" on a first (lower) tape 23 of "Mylar" (Du Pont TM.) or the like, using techniques known in the art. The second (upper) layer 21 may be thereafter bonded over 23 and ST' for protection of ST', etc. although layer 21 may in certain cases be dispensed with. One advantage to resilient web 15' in general, and the provision of upper layer 21 in particular, is that a magnetic keeper coating such as an electroless plated cobalt-nickel alloy, may be deposited on the "non-recording" surface of the web, i.e. on tape layer 21 to lie opposite medium 5 and provide an efficient magnetic flux return, thus improving recording efficiency, yet doing so in an inexpensive and convention manner.

Also illustrated in FIGURE 2, and as another feature of the invention, a selectably variable number of addressing (position-encoding) multitransducer conductor, C–1, C–2, C–3 etc. may likewise be affixed on web 15', according to the number of bits desired in the column-addressing code. Transducer assembly 1' lands itself to such advantageous features, whereby strips C may be arranged along respective address-bit channels such as exemplary channels B, C, D for individual bit readout thereof as known in the art. According to known address-encoding patterns, each such address strip will have a transducer node *n'* only along certan code-determined ones of columns *a'*, *b'*, *c'* etc., each columnar arrangement of nodes *n'* providing a unique addressing bit code (as binary 1, 0 codes illustrate).

Figure 7:
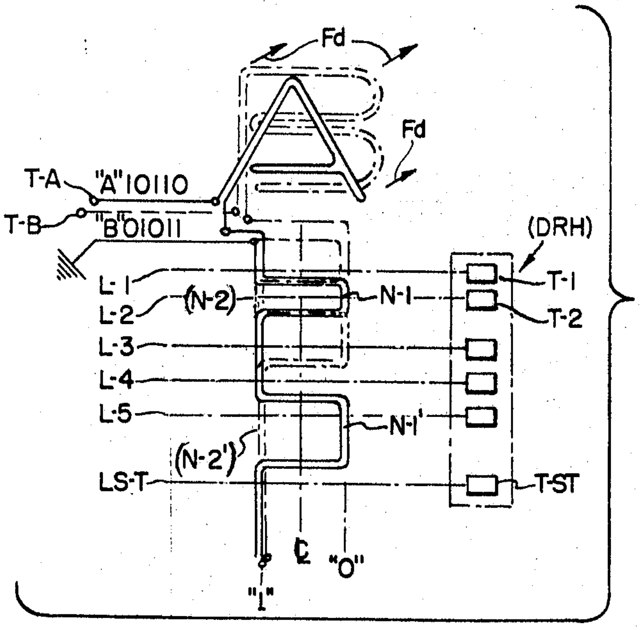
FIGURE 7 is a very schematic plan view of a pair of "character-heads" of the type used in the FIGURE 6 terminal, each head being shaped in the form of different characters.

Strips C and ST' may be alike in having a narrow conductor width *w* (and cross-section), as well as relatively narrow, column-centered node-width *nw* (for good signal resolution), being aligned longitudinally along respective channels B, C, D and A respectively, for readout of respectively-channelled signal recordings thereof by resepectively-aligned read channels of Read-head H (also functionally indicated in FIGURE 7).

Head 1' (1 also) may be modified in a number of ways within the contemplation of the invention. For instance, in cases where binary addressing signals from conductors C–1, C–2, C–3, etc. are not desired (e.g. to avoid need for decoding means), other, simpler signal-conductors may provide position coded strobe control bits (i.e. located in code relation with prescribed ones of the strobe nodes *n*). More particularly, such a simplified control conductor might extend along a prescribed track (e.g. B) and simply locate signal nodes at the first and the last strobe-node columns ot thereby indicate "beginning" and "end" of strobing automatically (at an associated control read head) without address-decoding, counting, etc. Workers in the art will appreciate that a strobing system such as described has many other advantages. For instance, besides providing asynchonous strobing as aforementioned, it is self-resynchronizing so that, similar to a mechanical clutch, it resynchronizes the strobe pattern ("slaves" itself) to each succeeding one of the control events (e.g. "incoming card detected") that it monitors.

It will be apparent to those skilled in the art that in its generally indicated operation, strobe head assembly 1 (head 1′ etc. similar) is disposed relative the surface of drum 5 so that the magnetic recording material thereof can be translated in recording relation past strobe conductor array ST′ thereon to be magnetized in a known manner in the desired pattern of recorded strobe bits, one bit at each node location. This entire strobe bit pattern is simultaneously generated when a prescribed write current pulse is applied (at lead LL) through conductor ST. That is, this write-(current) pulse evidently impresses strobe bits along drum sector L at the prescribed time (of the "control event") and is normalized to the desired strobe readout time by location relative read-head H. Thus, when these recorded bits are swept around past responsive readout head H, the data on the so-monitored control document (punched card) may be automatically strobed out under control of the strobe signal output from head H. Head H is thus positioned relative sector L so that the first strobe-bit is read out when the first data-column of the subject card, being advanced by feed rolls in synchronism with drum 5, is just activating the card read-head. As workers in the art will appreciate, the location of head H relative strobe sector L may be adjustable, being normalized to a particular data-format on a document so that upon recording the strobe-bit pattern at "start-time" (e.g. upon detection of the leading edge of an incoming card), these strobe-bits will be read out in synchronism with the passing of associated card columns over the card read-head. These strobe signals are preferably erased, such as by erase head H′, after readout thereof so that a following strobe pattern may be recorded in its own card-synchronized fashion (time). Erase head H′ may be a permanent magnet type or, preferably, comprise an AC electromagnet. Workers in the art will recognize that in some cases a magnetic tape medium, a disc or the like may replace drum 5, strobe head 1 being mounted and conformed in accordance therewith.

It will be apparent that the web matrix (e.g. 15) may be comprised of any suitably conformed, durable non-conductor, such as a plastic like the aforementioned Mylar. When it is not desired to make the head compliant, the strobe conductor may alternatively be potted in a plastic matrix to conform to the recording plane. In such a case, the strobe conductor may alternatively comprise merely a coil having one or more turns at each strobe (node) location. A suitably conformable low resistance conductive metal, such as copper, may be used for the strobe conductor.

It will be apparent that this single conductor, multi-transducer strobe wire according to the invention has many features of advantage such as convenient, inexpensive fabrication. Further, when such strobe heads according to the invention are adapted to be used in strobe arrangements like that (10) of FIGURE 1, they can very advantageously provide strobe signals which are continually transport-speed-synchronized (adjusting to changes therein), being initiated by, and constantly coupled to, the document advance means. Thus, recording drum 5 is coupled in a known manner with the document feed rolls (or other advance means) so that its (peripheral) speed $V_d$ has a known relation to document advance speed $V_F$. As a result the strobe head (e.g. head 1) may be constructed with strobe-nodes *n* centered along columns *a′*, *b′* etc.. Having a corresponding spacing (*d*–

1) related to these relative speeds, this spacing being adapted to step strobe bits past readout head H in the same time that the document is stepped between data columns. Thus, for example, if the drum and feed roll (peripheral) speeds are the same $V_d=V_F$, this strobe bit spacing *d*–1 will be substantially equal to the data column spacing on the document. The resulting flexibility and control advantages will be obvious to those skilled in the art. Moreover, if the data marks are packed on the document with a relatively high density, making the frequency of strobe pulses correspondingly high, then drum 5 may be "geared-up" so that its velocity $V_d$ is many times that of the document, thus allowing the spacing of strobe bits (and spacing *d*–1 of strobe nodes *n*) to be compensatorily extended to several times that of the data spacing. Conversely, if it is desired to compress the strobe bits much more than the document data marks (perhaps for minimizing the size of the strobing arrangement), drum 5 may be accordingly "geared-down" and the bit distance *d*–1 accordingly compressed. This will evidently allow the strobe drum 5 and the rest of the entire strobe assembly 10 to be proportionately miniaturized.

Figure 3:
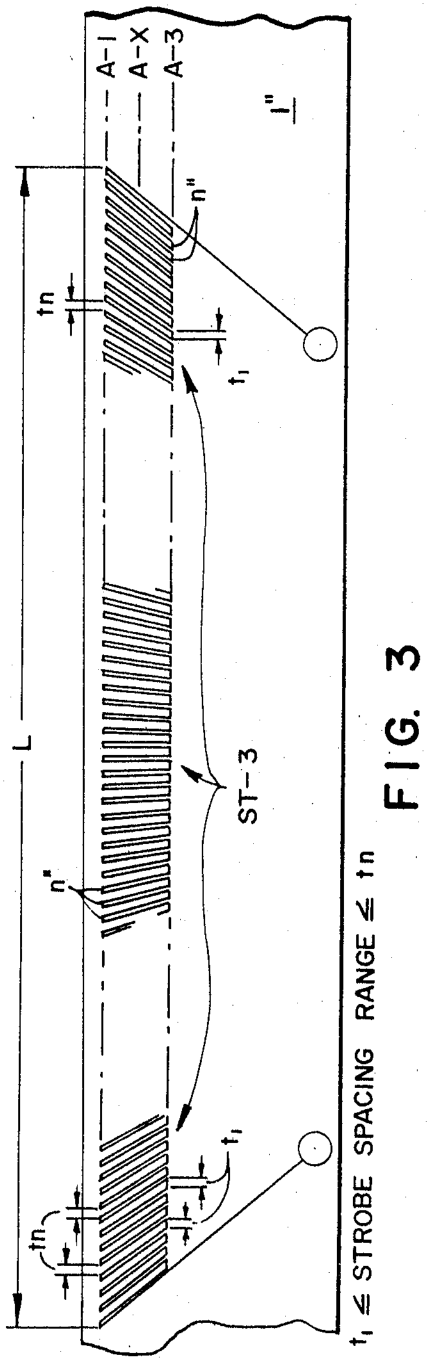
FIGURE 3 is a plan view of a strobe head similar to that in FIGURE 1, but slightly modified to take the form of a multifrequency, "skewed loop" pattern.
Figure 5:
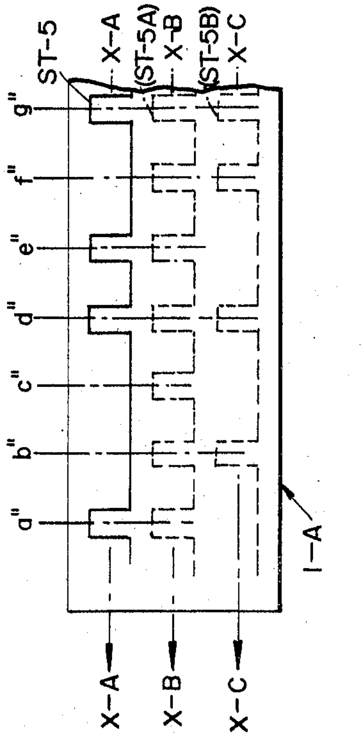
FIGURE 5 is a schematic plan view of a strobe head with patterns similar to those of FIGURE 2 but somewhat modified therefrom.
Figure 4:
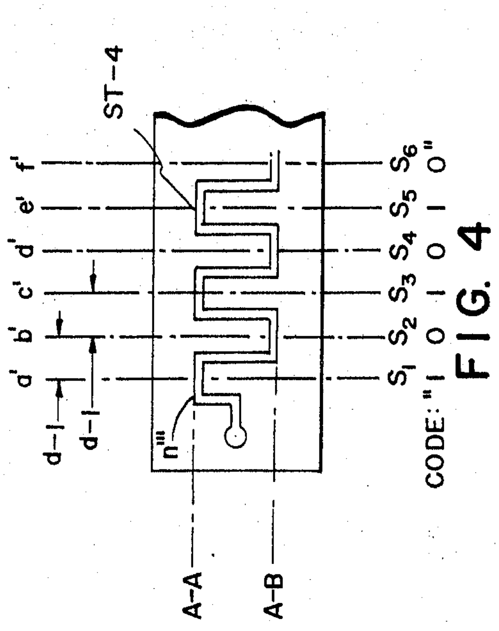
FIGURE 4 is a schematic plan view of a strobe head similar to that shown in FIGURE 1 but in a slightly modified pattern.

It will become evident to those skilled in the art that the single conductor, multitransducer assembly described above may be modified within this teaching to take a number of different alternate configuratins. Three such configurations are shown in FIGURES 3, 4 and 5. In FIGURE 4, a schematic plan view of an alternate assembly is indicated with a modified strobe conductor arrangement ST–4, the transducer nodes *n‴* thereof being alternately disposed along two adjacent strobe tracks A–A, A–B (intersection thereof by ST–4 locates a strobe bit) in a "dual, opposite-polarity" type recording pattern for improved compression of strobe bits. Of course, two readout channels must be provided in such a case, one for each such track, as known in the art. Thus, for instance, along track A–A strobe bits $s_1$, $s_3$, $s_5$ will be impressed, occurring along columns *a′*, *c′*, *e′*, etc. respectively; while, along the second track A–B strobe bits $s_2$, $s_4$, $s_6$, etc. are impressed, being aligned, respectively, along columns *b*, *d*, *f*, etc. To illustrate that these strobe bits need not necessarily be recorded magnetically, the nodes of conductor ST–4 are not "looped" as above, but are formed as a single wire segment to induce an electrostatic recorded bit image, a "ground plane" conductor being assumed as provided on the opposite side of the medium for such recording, as well known in the art.

Another feature and advantage of the invention is that it provides inexpensive strobe head assemblies which are easily replaceable, easily disposable, and easily rendered in a variety of different strobe-configurations, e.g. for different, selectable strobe formats. For example, a machine operator might like to be able to simply and quickly change the strobing (reading) format from that indicated in FIGURES 1 and 2 (where every card column was to be read out) to a modified "special" format where only certain card columns are to be read out. These modifications might take any one of a number of forms and it will be evident that the invention can quite simply provide freedom of format change such as by providing various selectable format patterns on a single head strip or by allowing one to quickly replace one strobe head strip with another (e.g. from his "file" of such head strips), or the like. The invention facilitates such quick, simple expedients for changing strobe control patterns. One such "special strobe format" conductor configuration is indicated in FIGURE 5 at ST–5 where only columns *a″*, *d″*, *e″*, *g″*, etc. are to be read out, while columns *b″*, *c″*, *f″*, etc. are not to be read. It should be recognized that this degree of strobing format freedom is novel as is the recording transducer structure which is simpler and easier to implement than in the prior art. The invention thus affords two superior strobing features, namely that of selectively changing strobe frequency and that of selecting only certain strobe bits (e.g. in a regular pattern like ST–5A) at selectable read out intervals (e.g. as indicated by ST–5B).

While special format head 1–A might provide only one such "special" strobe conductor ST–5 (to be read out along associated channel X–A), a plurality of such conductors may also be provided thereon along other tracks of the same head to give added flexibility without changing the head (strip). Thus, a different "special" control conductor ST–5B may also be provided on 1–A (to be read out along associated channel X–C) and as many other such conductors as is feasible. Such control conductors are intended to control a "reference" strobe conductor such as conductor ST–5A (to be read out along channel X–B) having nodes provided in prescribed columnar alignment with "certain" of these on each such control conductor. ST–5A will thus have its nodes disposed in column registry with associated nodes of "control" conductor ST–5B. Thus, in operation reference channel X–B may be continually detected and "AND-gated" with the output of "control channel" X–C (or any other such channel) to produce a strobe readout signal only upon coincidental detection in both the reference and (selected) control channels. Such a "composite readout" mode illustrates how a single such strobe head strip (like 1–A) can according to the invention control a plurality of different response-sequences (e.g. in place of address-bit conductors C–1, C–2, etc. in FIGURE 2 and their associated decoders, compare means, etc.). For instance, card-reading could be controlled along channel X–B and punching (or printing, marking, etc.) along channel X–C. The strobe patterns ST–5 etc. in FIG. 5 and ST–3 in FIG. 3 are shown very schematically, but will be understood as preferably comprising "looped" nodes as with ST′ in FIG. 2.

Besides card-reading, other response sequences, such as form printing, print spacing, article stamping, sorting, etc. may be automatically "strobe-programmed" or "multiprogrammed") on a single head strip according to the invention, being controlled to operate asynchronously and solely responsive to occurrence of a control sequence, such as the aforedescribed "incoming-card-detection" (or end-of-line printing, article passage, etc.). Unlike conventional machine-synchronized strobe arrangements, the arrangement of the invention is thus "subject-synchronous" only (e.g. card-advance-synchronous) and further, can initiate response operations responsive to pure position-increments, unrelated to a machine cycle or absolute position.

PRIOR ART

Workers in the art will recognize that the aforedescribed single conductor, multitransducer arrangements have several important advantages over prior art strobing arrangements. For instance, there are known "fixed-frequency" type strobe arrangements which, once initiated, produce strobe pulses at a prescribed unvarying frequency, independent of, and not synchronized with, changes in record transport speed. One such system initiates a multivibrator which emits such strobe pulses at a constant pre-selected frequency, and thus, obviously, cannot automatically adjust to changes in transport speed. Hence when such speed changes occur, serious strobing errors arise. Such errors can arise where a transport system varies the record velocity slightly, for instance during the readout of a single record or from record to record over a period of time (e.g. from week to week). Record transport arrangements can easily wander somewhat in applied velocity, e.g. due to roller wear, dirt on elements, etc., as workers in the art well know.

Other types of strobe systems have a more serious problem. Such are the "non-synchronous" type strobes where the frequency of the strobe generation is not automatically synchronized (registered) with the location of the data zones of a record (e.g. on card columns). One such strobe unit simply provides a strobe-code disc on a shaft coupled to be rotated in synchronising with the record transport and detects the passage of prescribed strobe markings (e.g. optical marks or magnetizations) on the disc past a reference detector (e.g. photo-cell or reluctance pick-up). Such a strobe generator cannot guarantee that these strobe marks will automatically register with the card columns on every data record (i.e., so that the strobe signals occur exactly contemporaneous with data-column passage in all cases.). Thus, they must provide expensive, cumbersome synchronizing means to electronically (or otherwise) effect this registration. One such synchronizing means arranges for the designation of a prescribed "first" strobe mark which must thus be specially detected and, worse yet, upon detection of an incoming data record the advance of the record through the read-station and associated record-readout must be delayed until this "first" strobe mark comes up—something disastrous to fast record throughput.

As another feature of advantage, made feasible by the advantageous construction of multitransducer conductors according to the invention, the strobe-conductor configuration may also be so arranged as to, of itself, facilitate finely-adjusting strobe frequency within a prescribed range. Such an embellishment is indicated in FIGURE 3 where such a multifrequency strobe head strip 1″ comprises a transducer conductor ST–3 on a web, as with the conductors in FIGURES 1 and 2, except that the transducer nodes are progressively skewed between two different pitch extremes. That is, nodes $n''$ extend across a node height defined between outer tracks A–1, A–3 so as to be progressively skewed in the direction of strobe generation (along segment L), each node being tilted to extend continuously between a maximum-spacing (high pitch $t_n$, along A–1) and a minimum-spacing (low pitch $t_i$, along A–3). Generally speaking, those skilled in the art will understand that a known readout means (strobe pickup head) may then be located selectively along any one of innumerable, parallel readout tracks between extreme outer tracks A–1, A–3 (e.g. along median track A–X) and that this location, per se, will allow modifying strobe output frequency. The range of such modification will be between extreme min./max. frequencies, $f_i f_n$ respectively, corresponding to min./max. pitch spacings $t_i$–$t_n$ (given constant record speed). Stated otherwise, this means that one may thus select a strobe pattern for producing strobe pulse readout from a readout head (e.g. head H, FIG. 1) to have a "finely-adjustable" pulse interval DP, corresponding to the prescribed, adjustable node spacing (or pitch increment DT where $t_n - t_i = DT$). Thus, the bit recording nodes $n''$ are arranged along their segmented length L to have a pitch varying from value $t_n$, as a maximum, continuously to a value $t$, as a minimum, over a predetermined pitch increment DT. For instance, assuming the pickup head H is aligned along intermediate strobe axis A–X, it will be appreciated that the pulse interval P between strobe-bit readout pulses will increase as the head is moved toward the "maximum-spacing" axis (A–1) and, conversely, will decrease as the head is moved towards the "minimum-spacing axis" (A–3). It will be apparent that a convenient expedient is thus taught for providing a finely variable range of strobe frequencies simply according to the range of printed node pitch of the strobe pattern (ST–3), given a constant transport speed, constant recording/readout conditions, etc. Of course, in fabricating such a multi-frequency strobe head, care must be taken to locate the conductor nodes properly (hold run-out tolerances, etc.); however, this is made relatively simple and inexpensive by the susceptibility of the head for "printed circuit" techniques as aforementioned, unlike prior strobe signal arrangements.

Thus it will be recognized that in these strobe pattern features the invention provides an improved method of, and apparatus for, transport-synchronized strobe pulse generation which employs as clock (synchronizing strobe) pulses, signals sensed from a specialized recorded strobe-bit pattern. According to the invention, such a pattern is easily rendered on a conventional (magnetic) medium which may be coupled for advancement synchronous with a document transport means. Pattern recordation is easily rendered by shaping of a single multitransducer conductor. Pattern readout is easily effected by a conventional (magnetic) read head which may, as an added feature, be made position-adjustable across the height of this strobe pattern to thereby vary the pulse readout interval over a prescribed range, doing so simply and with good accuracy.

DUAL-PATTERN RECORDING HEAD

Figure 6:
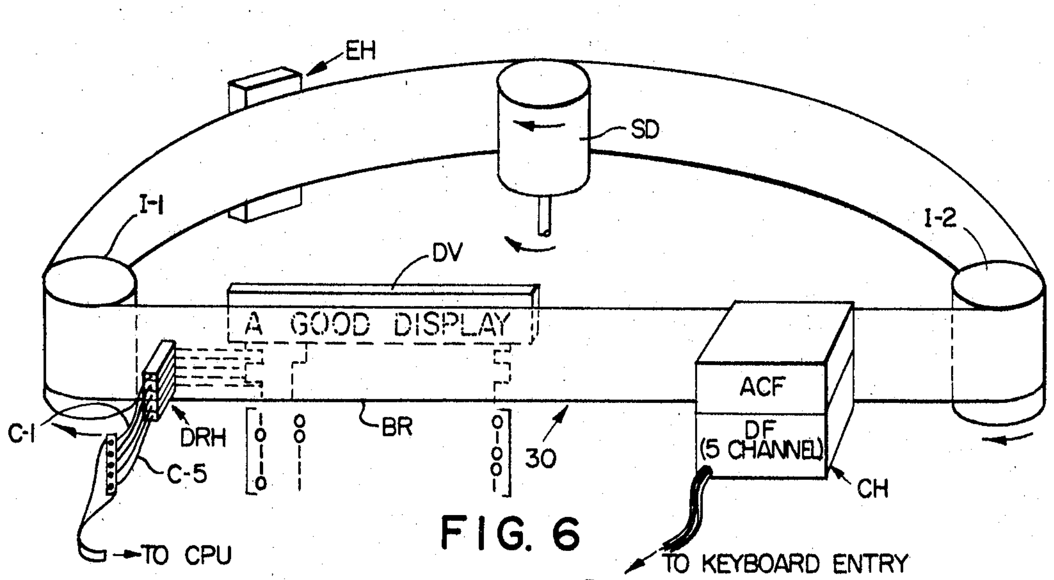
FIGURE 6 is a very schematic isometric view of a data transmission-display terminal incorporating a "character-head" embodiment of the invention differing from the strobe head embodiments above wherein a unitary pattern of human readable and machine readable information is simultaneously recorded.

In another, rather different, embodiment of the invention, the aforedescribed single conductor, multitransducer arrangement for recording a prescribed pattern of signal bits is shaped along its length to provide two informational (rather than strobe) bit patterns; namely, a first human-readable pattern and a second machine-readable pattern, the second pattern being a machine encoded version of the first. Such an embodiment characteristically employs a dual-pattern recording head arrangement examples of which are indicated, rather schematically, in FIGURE 7. FIGURE 6 shows typical, dual-pattern images on a magnetic recording tape BR incorporated in a novel data entry terminal 30. (See viewing station DV thereof.) Terminal 30 employs a file CH of many such head patterns adapted to selectively record on tape BR. A typical application of such dual-pattern transducer arrangements will become apparent upon following consideration of terminal 30. Here file CH, comprising many such dual-pattern recording heads, has two sections, a character-recording section ACF, containing one character-shaped conductor (like the character A etc. in FIGURE 7) for each character to be recordable, plus an associated code-recording section DF containing digital-code-shaped conductors, each corresponding to, and simultaneously activated with, a respective one of the character conductors. These character and code conductors may be formed from a single wire as shown in FIGURE 7 for characters A and (in phantom) B. File CH is connected, as indicated, to some character head selecting-energizing means (not shown), such as a conventional keyboard entry device for energizing selected, associated pairs of these dual-head conductors. A selected conductor will responsively record the selected character image on BR, together with an associated code image, recording both simultaneously and in prescribed positional relation. Typical character images are indicated in phantom at viewing station DV where a few exemplary code images are also shown, being in columnar alignment with associated character images (i.e. across the same column of tape BR), these code images (and their binary representations) being schematically indicated in phantom below illustrative characters A, G and Y. As indicated below, both the character and the code-pattern images comprise a pattern of magnetizations generally conforming to the (looped) shape of the recording conductor.

It will be apparent that in operation of terminal 30, belt BR is adapted to be controllably stepped by drive roll SD, in the direction indicated, past recording file CH, then past display station DV and, thereafter, past a prescribed multichannel machine-core readout head DRH, belt BR being aligned conventionally, such as with idler rolls I–1, I–2. After tape BR passes readout head DRH, it may be erased, such as by head EH. Code readout head DRH comprises, as particularized below, a multichannel magnetic read-head having a prescribed number of read-channels (five indicated here, although any selected number may be used, one for each code track), each read-head being adapted to detect binary-position-coded character bits along a corresponding recording-channel. All code bits along any particular column (e.g. under A image) will be understood to designate an associated character (the one they are columnarly aligned with). These (five-bit) machine-coded signals are automatically read out and transmitted to a utilization device (not shown), such as the central processor of a computer, as understood in the art. It will be apparent that in such a "key-to-tape" data entry terminal, this recording arrangement according to the invention provides a convenient "recording/verification/buffer storage" capability. It also simultaneously provides a human-readable display image of the recorded characters such as may be useful for operator (feedback) verification and possible correction prior to transmission of the code signals.

As indicated in more detail in FIGURE 7, recording unit CH may include a number of two-pattern conductor arrangements, one for each character to be transmitted. As illustrated for an A conductor and, sub-posed, a B conductor, each conductor is shaped, preferably in a double-wire or loop, to generally outline the printed (human-readable) form of a subject character, this outline to be recorded and displayed as shown. Preferably, an integral extension of this same character-wire is also traced (looped) through a series of character-encoding nodes (e.g. nodes N–1, N–1′, N–2, N–2′) to record a positional code pattern such as the illustrated "horizontal di-bit" pattern. For compactness, convenience, etc., many of the character wires may be stacked, superposingly, one behind the other, as indicated for B in FIGURE 7, along stacking direction $F_d$, as limited by the maximum recording gap useable (wire-tape gap). Where the maximum wire-tape gap (for good recording) is exceeded, or for any other purpose, the character wires may be otherwise stored; for instance, being positioned on a rotatable turret to be automatically called up into recording position upon demand (similar to a lens turret on a camera). As with the strobe conductors in FIGURES 1 through 5, these dual-pattern conductors will also be understood to record magnetic bits on all portions of tape BR which confront a current-pulsed conductor loop. Such a loop, or pair of opposite current carriers wherein the electro-magnetic fields reinforce, serve to magnetize bits in roughly the outline of the indicated characters and code-bit patterns. Five encoding channels, L–1 through L–5, are indicated in FIG. 7 along which recording and readout of various code-bit tracks is to take place. Thus, the encoding conductors are looped to describe horizontal ("1 or 0") di-bits along each of these tracks according to which side of a prescribed reference line ($C_L$) the node lies (intersection with respective channel axis L). Thus, node segments of the A conductor cross the "one column" along bit-tracks L–1, L–3, L–4; crossing the "zero column" along tracks L2 and L5 (nodes N–1, N–1′, respectively). Similarly, the B conductor (indicated in phantom), includes first and second nodes N–2, N–2′ crossing tracks L–2 and both of L–4 and L–5, respectively, along the "one column," while crossing the "zero column" along the other tracks. The readout head assembly DRH will accordingly include transducers T–1, T–2, etc. corresponding in number and position with each one of these track (channel) locations, the number and spacing of these code bit tracks being, of course, variable as feasible.

As another feature possible with this embodiment, it should be appreciated that shaped conductor heads may also be provided (in each such dual-pattern wire) which further include strobe-bits, these being adapted both to reference the position of the machine-code pattern and also to strobe the readout thereof. Such bits may be very simply recorded by extending each code-conductor across a strobe track location (here, track L–ST) to be read out by an associated strobe read head (T–ST indicated). It will be apparent that the provision of such a strobe bit may serve both to "self-strobe" each code-pattern out of the readout head (DRH—similar to the self-strobing provided by conductor ST′ in FIGURE 2) and also to reference the relative binary (one, zero) bit location in every horizontal di-bit or other position-coded pattern.

Although this indicated encoding conductor pattern is believed advantageous and preferable, it will be evident to those skilled in the art that modifications may be used. For instance, the character-shaped conductor need not be integral with the corresponding encoding conductor. Also, the encoding conductor may be configured to generate a vertical di-bit pattern such as ("1, 0") nodes *n–d, n–d'* of head *d* in FIGURE 8 (character "A"), the binary code bits being read out along respective (1, 0) tracks D–A, D–B. As another modification, the character conductors may be made continuous across several character shapes. For instance, several character shapes might be printed on a continuous multicharacter web in the manner of multitransducer conductor ST' in FIGURE 2 replacing nodes *n* thereof with successive different shaped characters. All such "character nodes" will be aligned along a common track at respective column intervals and be energized in common, the selected character shape being recording by sequentially confronting each character node with medium BR recordingly and timing the current pulse accordingly. In such a case, the code bits may similarly be made continuous along tracks. For instance, each code-conductor might be arranged like conductor C–1 to simultaneously generate all bits along a given channel for successive characters, respective code-conductor nodes being aligned with their associated character loops. In this case, recording could be controlled by rotating strip 15' (per FIGURE 2) as thus modified (e.g. upon a drum) past a recording station so that only one column recordingly confronts tape BR at any one time. By energizing all the multatransducer conductors when the "selected" character is in recording position, proper dual-pattern recording would occur.

Figure 8:
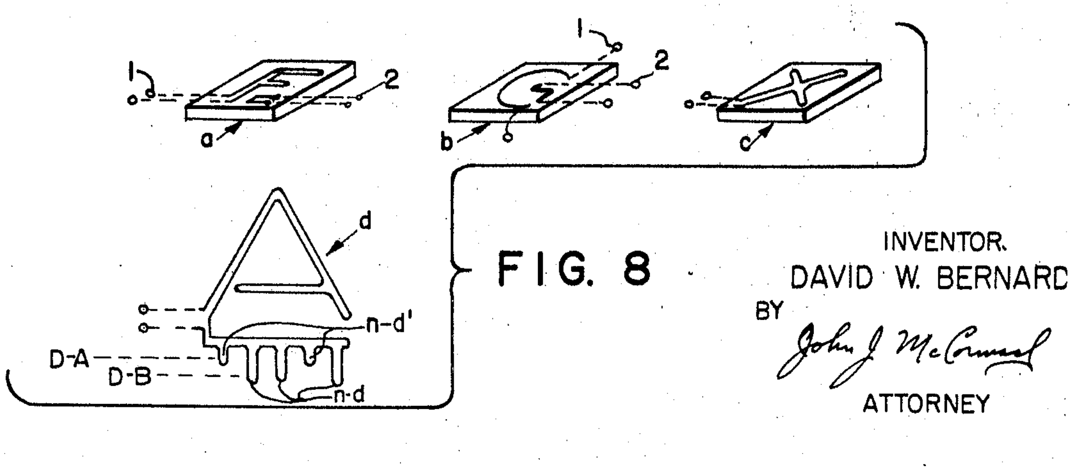
FIGURE 8 is a very schematic isometric of four "character-heads" similar to those in FIGURE 7 but modified slightly.

As a further modification and to reduce the number of planar arrays necessary for the character loops, FIGURE 8 indicates a few illustrative multicharacter planes *a, b* (two-conductors for imaging two different characters). For instance, if a first character (e.g. "F" or "C") is to be recorded, only one loop (#1) is energized; whereas if both loops are energized (i.e. #1 and #2) a second "segmented" character (e.g. "E" or "G," respectively) is recorded. Various other plural characters may be similarly recorded from such composite conductor patterns. Although only a single conductor may be used for the foregoing character imaging (e.g. for electrostatic recording), it is found preferable to use dual-conductor loops since they record a clearer better defined (magnetic) image and also are rather more versatile (e.g. see plane C in FIGURE 8—could a single wire define an X image as well?).

It will be apparent to those skilled in the art that the principles of the present invention may be applied to different embodiments from those shown using analogous elements, etc. While in accordance with the provisions of the statutes, there have been illustrated and described the best forms of the invention known, it will be apparent to those skilled in the art that changes may be made in the elements disclosed without departing from the spirit of the invention and that, in some cases, certain features of the invention may be used to advantage without a corresponding use of other features.

What is claimed is:

1. A strobe head for recording a pattern of strobe images along at least one track segment of a medium in response to predetermined write signals, said head comprising:

a multiconductor transducer including at least one said conductor for recording each said image pattern, said conductors being aligned to extend relatively parallel to an associated track segment in recording relationship therewith, at least one of said conductors comprising a variable strobe frequency transducer, each such conductor having loop nodes thereof extending in an increased pitch, increasingly skewed fashion across a pair of spaced parallel first and second strobe axes, said first strobe axis including regular bit index points spaced therealong a prescribed minimum pitch distance, said second strobe axis having related bit index positions spaced a second maximum pitch distance therealong, said distances differing by a prescribed pitch increment; each said node of said conductor thus being adapted to intersect said axes at said index points in regular sequential order extending continuously therebetween to thereby record a similarly skewed pattern along said associated medium between minimum pitch and maximum pitch channel segments thereof, upon application of prescribed write signals so that a variable frequency readout may be automatically obtained according to the position of a strobe read head between said channels, the frequency range thereof being proportional to said pitch increment.

2. The combination as recited in claim 1 wherein each said conductor comprises a multiloop strobe wire, each said strobe wire being affixed on at least one non-conductive web substrate so as to be conformed with a prescribed magnetic recording medium operatively associated therewith along a prescribed recording plane; wherein transport means are provided to move said head relative to said medium recordingly; wherein each said conductor node comprises a like pair of parallel, closely-spaced opposite directed wire segments comprising a narrow magnetic transducer; and wherein said strobe head also includes energizing control means adapted to apply said write signal to a prescribed one of said conductors for generating an associated strobe bit pattern responsive to control signals applied thereto, said control signals indicating a prescribed "strobe-start" condition of a monitored reference subject.

3. A strobe head for recording a pattern of strobe bit images along at least one track segment of a medium in response to predetermined write signals, said head comprising:

a transducer including at least one conductor for recording each said image pattern, said conductor being aligned to extend relatively parallel to an associated track segment in recording relationship therewith, said conductor including a variable frequency portion having like nodes looped in progressively skewed fashion between maximum and minimum pitch increments to effect a corresponding skew in the image pattern recorded thereby, so that a segment associated read head, variably positionable with respect to the height of said nodes, may be adjusted to provide a variable output frequency proportional to the difference between said pitch increments.

References Cited

UNITED STATES PATENTS

| | | | |
|---|---|---|---|
| 2,786,895 | 3/1957 | Rettinger | 346—74 |
| 2,841,461 | 7/1958 | Gleason | 346—74 |
| 2,958,568 | 11/1960 | Hagelbarger | 346—74 |
| 3,013,206 | 12/1961 | Youngquist | 340—174.1 |
| 3,045,218 | 7/1962 | Brand | 346—74 |
| 3,167,777 | 1/1965 | Zagorites | 340—174.1 |
| 3,292,171 | 12/1966 | Wilson | 346—74 |
| 3,386,101 | 5/1968 | Sims | 346—74 |

BERNARD KONICK, Primary Examiner

G. M. HOFFMAN, Assistant Examiner

U.S. Cl. X.R.

340—324, 336; 346—74

UNITED STATES PATENT OFFICE

CERTIFICATE OF CORRECTION

Patent No. 3,491,352 January 20, 1970

David W. Bernard

It is certified that error appears in the above identified patent and that said Letters Patent are hereby corrected as shown below:

Column 11, line 63, after "strobe", second occurrence, insert -- bit --.

Signed and sealed this 8th day of December 1970.

(SEAL)
Attest:

Edward M. Fletcher, Jr.
Attesting Officer

WILLIAM E. SCHUYLER, JI
Commissioner of Patent